May 18, 1926.

C. M. VAN HUSAN

GARDEN CARRYALL

Filed April 4, 1925

1,585,575

Inventor:

Christina M. Van Husan

By

Attorneys.

Patented May 18, 1926.

1,585,575

UNITED STATES PATENT OFFICE.

CHRISTINA M. VAN HUSAN, OF DETROIT, MICHIGAN.

GARDEN CARRYALL.

Application filed April 4, 1925. Serial No. 20,634.

There has long been the desire on the part of amateur gardeners and those who take an interest in the upkeep of small gardens or lawns to possess some form of carryall or equipment which would lend itself peculiarly to this class of work, without being cumbersome or expensive, and without possessing the disadvantages attending the use of wheeled devices such as wagons or wheelbarrows; and this invention therefore has for its purpose to provide a simple and cheaply constructed device particularly adapted to meet these needs and which will serve the general purposes of the small gardener.

The invention further aims to provide a device somewhat in the form of a sleigh, but not for the same purposes, having runners which permit its passing over grass or somewhat uneven ground with greater stability than is usual with wagons or wheelbarrows, which device, by reason of such runners, has an extended bearing surface on the ground unlikely to cause damage or create depressions therein such as is frequently caused by wheeled vehicles in lawns, and which, for the same reason and as a result of its general construction, may be used as a seat by the gardener while performing many of the gardening operations. The said device is intended to carry in a convenient manner seedlings, plants, flower pots, small gardening implements and garden refuse such as may be required.

Still further objects subsidiary to or resulting from the aforesaid objects, or from the construction or operation of the invention as it may be carried into effect, will become apparent as the said invention is hereinafter further disclosed.

In carrying said invention into effect, I may provide essentially as a gardener's carryall, a structure mounted upon elongated runners, said structure having a flat top providing a seat beneath which is arranged an implement drawer slidable laterally of the seat in both directions, so that access thereto may be had from either side of the device, a fixed receptacle for plants, seedlings, loam or other substances or articles at one end of said seat, a detachable receptacle for garden refuse at the other end of said seat, the said runners projecting longitudinally beneath said receptacles, and means for pulling the device from place to place.

All of which is more particularly described and ascertained hereinafter, by way of example, having reference to the accompanying drawing, wherein—

Similar characters of reference indicate similar parts in the several figures of the drawing.

Figure 1:
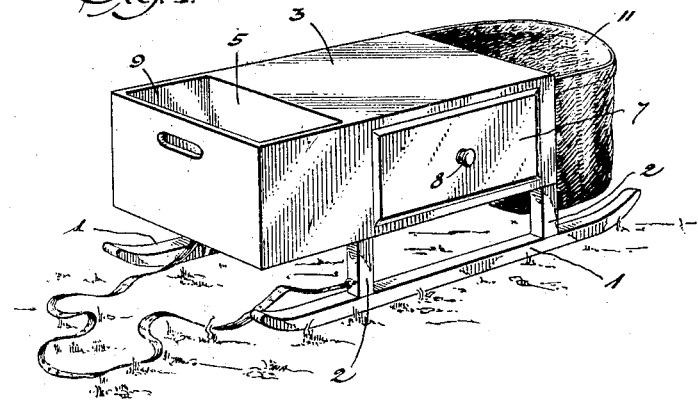
Figure 1 is a perspective view of a device embodying the said invention.
Figure 2:
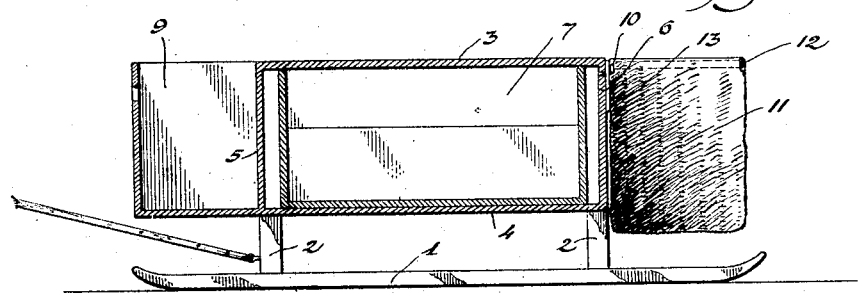
Figure 2 is a vertical longitudinal section of the same.
Figure 3:
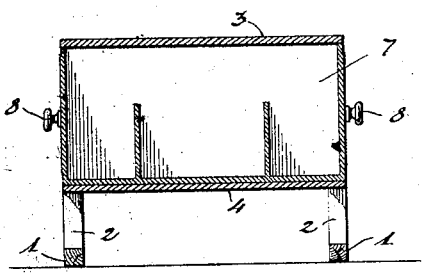
Figure 3 is a transverse section of the same.

The illustrated device shows elongated runners or skids 1 from which upwardly extend legs 2 which support a structure having top and bottom walls 3 and 4 and end walls 5 and 6, the upper wall 3 of the said structure forming a seat for the user of the device. This structure is open laterally and slidably accommodates a drawer 7 having a handle 8 on either end thereof so that it may be withdrawn from either side of the said structure for access thereto. This drawer is intended to accommodate small gardening implements or seeds or other articles which it may be desirable to place therein, is readily accessible to a person sitting on the seat 3 or who may be working about the device, and enables the gardening implements, and so forth, to be kept together and transported in a readily accessible and compact manner.

On one end of the structure a receptacle 9 is provided for any useful purpose such as the accommodation of plants, seedlings or loam; and at the opposite end of the said structure hooks 10 are provided upon which a receptacle 11 is detachably hung, the said receptacle being indicated as h... g a metal rim 12 engaged by the hooks together with a plate 13 connected to said rim and lying against the wall 6 for the purpose of properly supporting the rim 12 outwardly of the said wall 6 as will be well understood. This receptacle 11 is intended to receive garden refuse such as weeds, stones, grass, and so forth which it is desired to remove from the garden.

In a preferred from of the device the skids or runners extend forwardly and rearwardly substantially beneath the receptacles 9 and 11, so that if either of the said receptacles be heavily loaded there will be no tendency of the device to tilt endwise as a result.

The described device is of a very simple nature and admits of cheap construction, but has proved to be very useful to small gardeners, affording a seat which may be hauled from place to place as the work proceeds, together with transportation of the implements, plants, bulbs, and so forth as well as being always at hand to receive weeds and other refuse as required, and saves a great deal of labor in the moving around of a number of articles and receptacles as is the common practice in gardening. At the same time it is very unlikely to be upset by unevenness of the ground over which it is moved or to run down slopes or into depressions as is the case with wagons such as are sometimes employed for the transportation of a gardener's material.

It will be understood that the use of the different receptacles may be suited to the ideas of the worker, the uses mentioned herein being merely suggestions illustrating the utility of the device in general.

This invention may be developed within the scope of the following claims without departing from the essential features of the said invention, and it is desired that the specification and drawing be read as merely illustrative and not in a limiting sense, except as necessitated by the prior art.

What I claim is:—

1. As a new article of manufacture, a gardener's carryall including a pair of skids, a seat structure supported above said skids, and an implement drawer beneath said seat structure, said drawer being slidable outwardly of both sides of the said structure.

2. As a new article of manufacture, a gardener's carryall including a pair of skids, a seat structure supported above said skids, a drawer beneath said seat structure, a fixed receptacle on one end thereof, and a removable receptacle on the opposite end thereof.

In testimony whereof I affix my signature.

CHRISTINA M. VAN HUSAN.